US012175264B2

(12) United States Patent
Enoka et al.

(10) Patent No.: US 12,175,264 B2
(45) Date of Patent: Dec. 24, 2024

(54) PRESENTATION SYSTEMS AND METHODS

(71) Applicant: Canva Pty Ltd, Surry Hills (AU)

(72) Inventors: Samuel Enoka, Sydney (AU);
Cameron Adams, Rozelle (AU); Ho Wai Anthony Kong, Surry Hills (AU);
Ashwanth Fernando, Baulkham Hills (AU); Ross Justin Bille, Surry Hills (AU); Gabriela Febriana, Surry Hills (AU); Anna Azzam, Surry Hills (AU)

(73) Assignee: Canva Pty Ltd, Surry Hills (AU)

( * ) Notice: Subject to any disclaimer, the term of this patent is extended or adjusted under 35 U.S.C. 154(b) by 27 days.

(21) Appl. No.: 17/927,880

(22) PCT Filed: May 26, 2021

(86) PCT No.: PCT/AU2021/050502
§ 371 (c)(1),
(2) Date: Nov. 26, 2022

(87) PCT Pub. No.: WO2021/237287
PCT Pub. Date: Dec. 2, 2021

(65) Prior Publication Data
US 2023/0205808 A1    Jun. 29, 2023

(30) Foreign Application Priority Data
May 26, 2020   (AU) ................................ 2020901701

(51) Int. Cl.
*G06F 9/451*    (2018.01)
*G06F 3/0483*   (2013.01)
(Continued)

(52) U.S. Cl.
CPC ............ *G06F 9/451* (2018.02); *G06F 3/0483* (2013.01); *G06F 3/0484* (2013.01);
(Continued)

(58) Field of Classification Search
CPC ...... G06F 16/4393; G06F 9/451; G06F 3/165; G06F 2203/04803
See application file for complete search history.

(56) References Cited

U.S. PATENT DOCUMENTS 8,433,178 B2     4/2013  Ikeda et al.
2007/0171192 A1  7/2007  Seo et al.
(Continued)

FOREIGN PATENT DOCUMENTS

WO    2013088760 A1    6/2013
WO    2015077894 A1    6/2015

OTHER PUBLICATIONS

"How to use Loom Video Recorder," https://www.youtube.com/watch?v=3PY6v9s1MU8, Reported as uploaded on Jun. 13, 2018.
(Continued)

*Primary Examiner* — Andrea C Leggett
(74) *Attorney, Agent, or Firm* — GrowIP Law Group LLC

(57) ABSTRACT

Described herein is a computer implemented method. The method includes a client application generating a document request and communicating the document request to a server system. The client application receives: document data including page data in respect of a plurality of pages of the document; recorded interaction data defining one or more interactive events that occurred during a recording of a presentation associated with the document; and media data including audio and/or video data recorded during the recording of the presentation. The client application replays the presentation by using the recorded interaction data to synchronise display of the pages with playback of the media data.

19 Claims, 4 Drawing Sheets

(51) Int. Cl.
*G06F 3/0484* (2022.01)
*G06F 3/04842* (2022.01)
*G06F 3/16* (2006.01)
*G06F 16/438* (2019.01)

(52) U.S. Cl.
CPC .......... *G06F 3/04842* (2013.01); *G06F 3/165* (2013.01); *G06F 16/4393* (2019.01); *G06F 2203/04803* (2013.01)

(56) References Cited

U.S. PATENT DOCUMENTS

| | | | |
|---|---|---|---|
| 2008/0126943 | A1 | 5/2008 | Parasnis et al. |
| 2009/0059094 | A1 | 3/2009 | Yi et al. |
| 2011/0161834 | A1 | 6/2011 | Shadfar et al. |
| 2012/0296914 | A1 | 11/2012 | Romanov et al. |
| 2014/0033073 | A1 | 1/2014 | Pegg |
| 2014/0123014 | A1 | 5/2014 | Keen |
| 2014/0218370 | A1 | 8/2014 | Mishra et al. |
| 2016/0191975 | A1 | 6/2016 | Ju |
| 2016/0344828 | A1* | 11/2016 | Häusler ............... H04L 67/1044 |
| 2017/0279862 | A1 | 9/2017 | Bader-Natal et al. |
| 2018/0358049 | A1 | 12/2018 | Latulipe et al. |
| 2019/0073640 | A1 | 3/2019 | Udezue et al. |
| 2019/0268348 | A1 | 8/2019 | Miller et al. |
| 2020/0204880 | A1 | 6/2020 | Viswanathan |

OTHER PUBLICATIONS

Bederson et al., Experiencing the International Children's Digital Library, interactions 15, 6 (Nov. + Dec. 2008), pp. 50-54.

Bederson et al., Implementing a zooming user interface: experience building Pad++, Software: Practice and Experience, vol. 28(10), pp. 1101-1135, Aug. 1998.

Bederson et al., Jazz: an extensible zoomable user interface graphics toolkit in Java, In Proceedings of the 13th annual ACM symposium on User interface software and technology (UIST 2000), Association for Computing Machinery, New York, NY, USA, pp. 171-180.

Bly et al., A comparison of Tiled and Overlapping Windows, CHI, pp. 101-106, Apr. 1986.

Bonsignore et al., Sharing Stories "in the Wild": A Mobile Storytelling Case Study Using StoryKit, ACM Transactions on Computer-Human Interaction, vol. 20, No. 3, pp. 18-38, Jul. 2013.

Druin et al., KidPad: A Design Collaboraiton Between Children, Technologists, and Educators, CHI, pp. 463-470, Mar. 22-27, 1997.

Eric Kasten, HTML: A Gentle Introduction, Linux J., 1995, 15es, Article 3 (Jul. 1995).

Good et al., Zoomable user interfaces as a medium for slide show presentations, Information Visualisation, pp. 35-49, 2002.

Kizilcec et al., Showing Face in Video Instruction: Effects on Information Retention, Visual Attention, and Affect, CHI 2014 (Entire Document).

Krosnick, VideoDoc: Combining Videos and Lecture Notes for a Better Learning Experience, pp. 1-93, 2015.

Quinn et al., Readability of scanned books in digital libraries, In Proceedings of the SIGCHI Conference on Human Factors in Computing Systems, CHI 2008, Association for Computing Machinery, New York, NY, USA, pp. 705-714.

Written Opinion of the International Search Authority for PCT/AU2021/050502 mailed Jul. 27, 2021.

Written Opinion of the International Search Authority for PCT/AU2021/050501 mailed Jun. 29, 2021. (Entire Document).

* cited by examiner

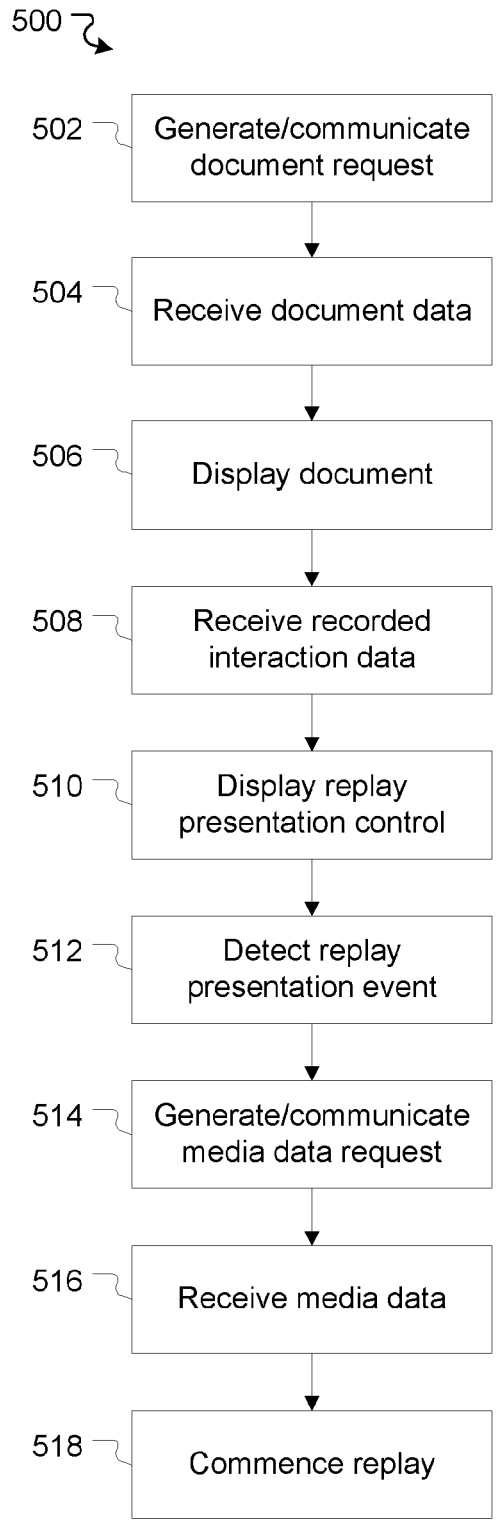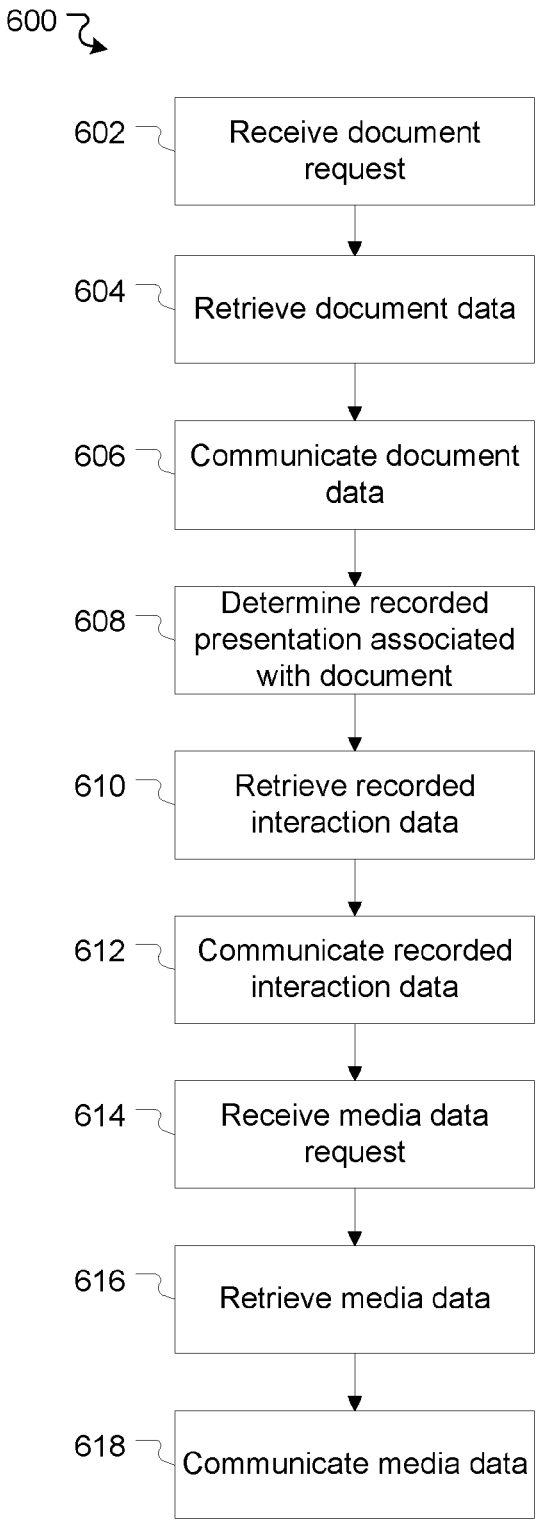
Fig. 5
Fig. 6

PRESENTATION SYSTEMS AND METHODS

CROSS-REFERENCE TO RELATED APPLICATIONS

This application is a U.S. National Stage Application that claims the benefit of the filing date of International PCT Application No. PCT/AU2021/050502, filed on May 26, 2021, that claims priority to Australian Patent Application No. 2020901701, filed May 26, 2020, that are hereby incorporated by reference in their entirety.

FIELD

The present disclosure is directed to presentation systems and methods and, in particular systems and methods for recording, storing, and/or replaying presentations.

BACKGROUND

Computer aided presentation tools for facilitating presentations are known.

Generally speaking, such presentation tools involve software and hardware which enable a presenter to display a document and record audio and/or video of themselves presenting with that document. The presentation is encoded into a video file format which can then be sent to other users to replay the presentation.

SUMMARY

Described herein is a computer implemented method including: generating, at a client system, a document request identifying a document; communicating the document request to a server system; receiving document data, the document data including page data in respect of a plurality of pages of the document; receiving recorded interaction data defining one or more interactive events that occurred during a recording of a presentation associated with the document; receiving media data including audio and/or video data recorded during the recording of the presentation; and replaying the presentation at the client system by using the recorded interaction data to synchronise display of the pages with playback of the media data.

Also described herein is a computer implemented method including: receiving, at a server system, a document request from a client system, the document request identifying a stored document; retrieving document data in respect of the stored document, the document data including page data defining a plurality of pages of the stored document; retrieving recorded interaction data defining one or more interactive events that occurred during recording a presentation associated with the stored document; retrieving media data including audio and/or video data recorded during recording of the presentation associated with the document; and communicating the document data, the recorded interaction data, and the media data to the client system.

BRIEF DESCRIPTION OF THE DRAWINGS

In the drawings:

FIG. 5 depicts client-side operations performed in replaying a presentation.

FIG. 6 depicts server-side operations performed in replaying a presentation.

Figure 1:
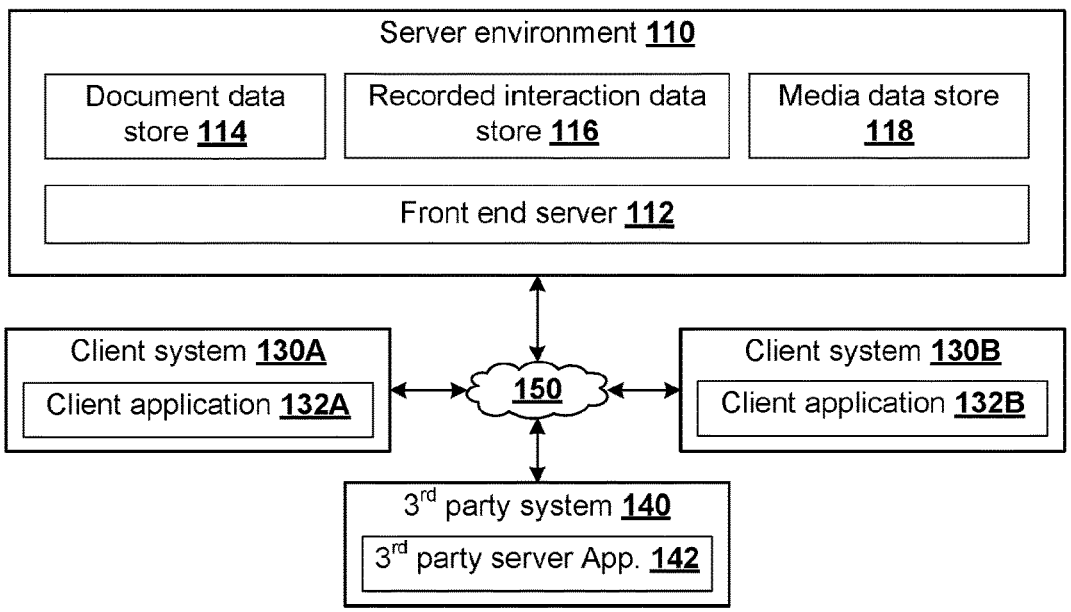
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

Software tools for recording presentations exist. Generally speaking, such tools may allow a presenter to record a presentation that involves audio and/or video of the presenter talking to a document (e.g. a slide show or the like). Such a presentation is then stored as a monolithic file—for example a single file in a video format such as the MPEG-4 format, .MOV format, or another video format. The presentation video file can then be communicated to and replayed by another user down the track.

One issue with such presentation tools is that by recording and storing a presentation in a single video file the presentation documents (or pages thereof) are merged into the video file as part of the video encoding process. As a result, any content in the document that was originally interactive becomes non-interactive.

Consider, for example, a document with a page that includes an element (e.g. a text element, an image element, a video element or any other type of element) that has been configured as a hyperlink (e.g. associated with a universal resource locator (URL)). In the original version of the document the element is an interactive element that the user can interact with. For example, the presenter can click on (or otherwise select/interact with) the element to cause a webpage to be launched at the URL associated with the element. In the recorded version of the presentation, however, the encoding of the document pages into the video file format results in merged images of the original document pages which cannot be interacted with. As such, any elements of the document that were originally interactive (e.g. the hyperlinked element described above) become non-interactive: a user viewing the recorded presentation cannot interact with the element.

The present disclosure is directed to systems and methods for recording, storing, and replaying presentations in a manner that maintains interactive elements of an original document as interactive elements in any replay of the presentation.

Turning to FIG. 1, a networked environment 100 in which the various operations and techniques of the present disclosure can be performed.

Networked environment 100 includes a presentation server environment 110 (server environment 110 for short), one or more client systems 130, and (in this example) one or more third party systems 140. The server environment 102, client systems 120, and third party system are interconnected via one or more communications networks 150 (e.g. the Internet). The Generally speaking, the server environment 110 provides server-side functionality for recording, storing, and replaying presentations as described below.

While various architectures are possible, the server environment 110 in the present example is a scalable system in which resources (e.g. compute nodes) are commissioned and decommissioned according to demand—e.g. in a public or private cloud-type system.

The various functions performed by the server environment 110 are described as being performed by applications. The function of a given application may be provided by a single compute node (or computer processing system) or several compute nodes (or computer processing systems). Furthermore, in some cases the function provided by a given application could be provided by one or more alternative applications, and/or the functionality described as being provided across multiple applications could be performed by a single application.

In the present example, server environment 110 includes a front-end server application 112 (front-end server 112 for short). The front-end server 112 is executed by a computer processing system to configure that system to provide server-side functionality to one or more corresponding client applications (e.g. client applications 132 described below).

In addition to the specific functionality described herein, the server-side functionality provided by the front-end server 112 (alone or in conjunction with other applications) can include typical functions provided by a server system—for example user account creation and management, user authentication, and the like.

To provide the server-side functionality, the front-end sever 112 comprises one or more application programs, libraries, APIs or other software elements that implement the features and functions that are described herein. For example, where a given client application 130 (described below) is a web browser, the front-end server 112 will be a web server such as Apache, IRS, nginx, GWS, or an alternative web server. Where a client application 130 is a native application, the front-end server 112 will be an application server configured specifically to interact with that client application 130. The server environment 110 may be provided with both web server and application server applications allowing it to interact with both web and native client applications.

In the present example, server environment 110 also includes a document data store 114 for storing document data (described further below), a recorded interaction data store 116 for storing and retrieving recorded interaction data (described further below), and a media service data store 118 for storing and retrieve media data (described further below). Each of the data stores 114, 116, and 118 may, for example, include a database application such as Amazon DynamoDB or an alternative database which accesses appropriate storage devices for data storage and retreival. While three data stores are depicted in the present example additional or fewer data stores could be provided. For example, a single data store could be provided to store document data, recorded interaction data, and media data. As another example, rather than using a single media data store 118 separate audio and video media stores could be provided.

In order to provide server side functionality to clients, the server environment 110 will typically include additional applications to those illustrated and described. As one example, the server environment 110 may include a load balancing type application which can operate to determine demand, direct client traffic to the appropriate front-end server 112 (where multiple front end server applications 112 have been commissioned), trigger the commissioning of additional server (and/or other) applications if required to meet the current demand, and/or trigger the decommissioning of server (and/or other) applications if they are not functioning correctly and/or are not required for current demand.

The precise hardware architecture of the server environment 110 will vary depending on implementation, however it will typically include multiple computer processing systems (e.g. server systems) which communicate with one another either directly or via one or more networks—e.g. one or more LANS, WANs, or other networks (with a secure logical overlay, such as a VPN, if required).

A client system 130 hosts a client application 132. When executed, the client application 132 configures the client system 130 to provide client-side functionality.

The client-side functionality provided by the client application 132 is described further below. Generally speaking, however, client-side functionality includes causing the client system 130 to output data, e.g. via a display, speaker, or other output device. Such data may include data generated by the client application 132 itself, and/or data received from (or generated based on data received from) from the server environment 110. Client-side functionality also generally includes receiving and processing user inputs from various input devices (e.g. touch screen, keyboard, mouse, or other input device). User inputs are typically received by the client application 132 via an operating system or other application running on the client system 130. Client-side functionality also generally includes communicating data to the server environment 110, e.g. data input by a user and/or data generated by the client application 132 based on data input by a user.

The client application 132 may be a general web browser application (such as Chrome, Safari, Internet Explorer, Opera, or an alternative web browser application) which accesses the front end server 112 via an appropriate uniform resource locator (URL) and communicates with the front end server 112 via general world-wide-web protocols (e.g. http, https, ftp). Alternatively, the client application 130 may be a native application programmed specifically to communicate with the front end server 112 using defined application programming interface (API) calls.

A client system 130 may host both a web browser client application and a native application.

In terms of hardware, client system 130 may be any computer processing system which is configured (or configurable) by hardware and/or software to offer client-side functionality. By way of example, the client system 130 may be a desktop computer, a laptop computer, a netbook computer, a tablet computing device, a mobile/smart phone device, a personal digital assistant, or an alternative computer processing system.

Although not illustrated in FIG. 1, a client system 130 will typically have additional applications installed thereon, for example an operating system application such as Microsoft Windows®, Apple macOS, Apple iOS, Android, Unix, or Linux.

FIG. 1 depicts two client systems 130A and 130B, respectively hosting client applications 132A and 132B. In the examples described herein, and for ease of distinction: client system 130A is operated by a presenter to record a presentation and, accordingly, client application 132A is in a presenter mode of operation; client system 130B is operated by a viewer who is accessing and viewing a recorded presentation and, accordingly, client application 132B is in a presentation viewing mode of operation.

While only two client systems are depicted, the server environment 110 will typically serve many more client systems (and client applications).

Environment 100 also includes a third party system 140 running a third party server application 142. In the present examples the third party system 140 serves content (e.g. webpages, documents, video clips, audio clips, and/or other content) and is accessed via an appropriate URL.

Various features and techniques described herein are implemented using one or more computer processing systems.

For example, in networked environment 100 described above, each client system 130 is a computer processing system (for example, a personal computer, tablet/phone device, or other computer processing system). The various functions of the server environment 110 are also provided by one or more computer processing systems (e.g. server computers or other computer processing systems). For example, where server environment 110 is a scalable system, multiple front-end server applications 112 may be operational, each running on a compute node which, in turn, will be running on one or more physical computer systems.

Figure 2:
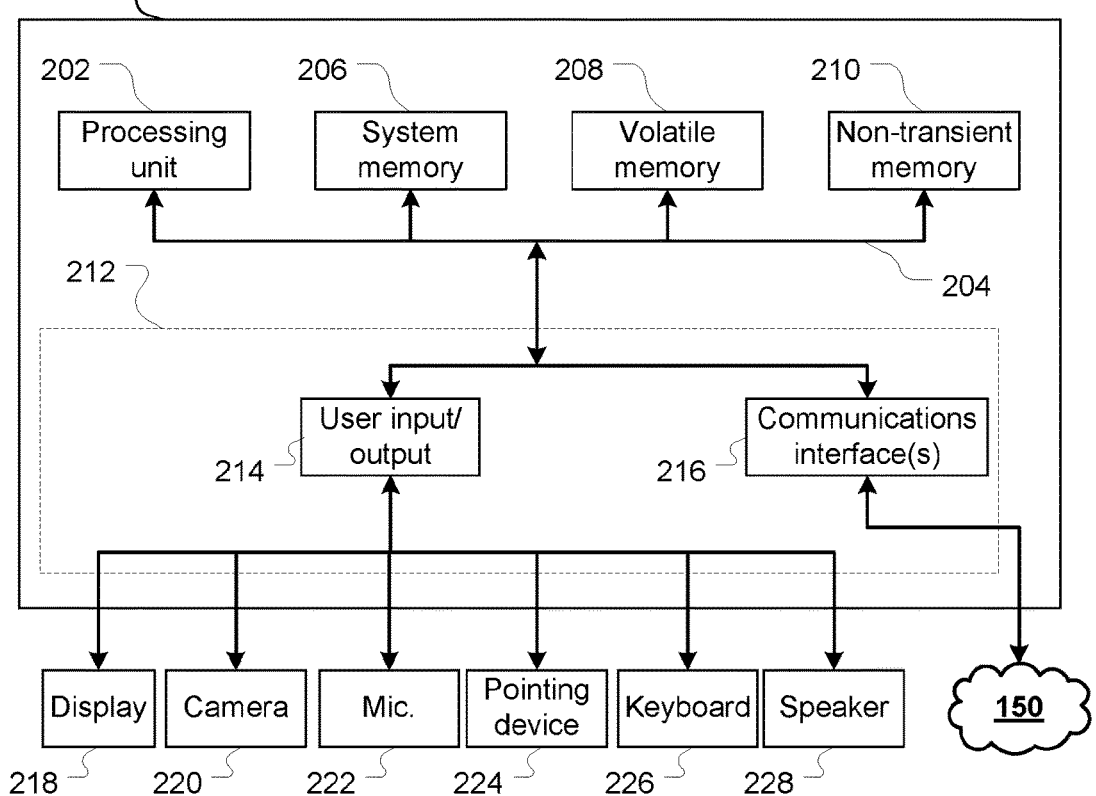
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-transient memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), and/or other wireless connections.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a display (e.g. a LCD, LED, touch screen, or other display device), speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

By way of example, where system 200 is a client system such as 130 it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

System 200 also includes one or more communications interfaces 216 for communication with a network, such as network 150 of environment 100 (and/or a local network within the server environment 110). Via the communications interface(s) 216, system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium such as 210 accessible to system 200. Instructions and data may be transmitted to/received by system 200 via a data signal in a transmission channel enabled (for example) by a wired or wireless network connection over an interface such as communications interface 216.

Applications accessible to system 200 will typically include an operating system application. System 200 also stores or has access to applications which, when executed by the processing unit 202, configure system 200 to perform various computer-implemented processing operations described herein. For example, and referring to the networked environment of FIG. 100 above, server environment 110 includes one or more systems which run a front-end server application 112, a document service application 114, a recorded interaction service 118, and a media service 122. Similarly, client system 130 runs a client application 132 and third party server system 140 runs a third party server application 142.

In some cases part or all of a given computer-implemented method will be performed by system 200 itself, while in other cases processing may be performed by other devices in data communication with system 200.

In the present disclosure, presentations that are recorded and stored at the server environment 110 are made up of three distinct data sets: document data (in the present examples stored in document data store 114), recorded interaction data (in the present examples stored in recorded interaction data store 116), and media data (in the present examples stored in media data store 118).

The document data for a given recorded presentation is data in respect of a document that a presenter displays and interacts with over the course of a presentation. In the present disclosure the document data in respect of a given document defines one or more pages and each page includes one or more elements (e.g. text elements, raster image elements, vector image elements, audio elements, video elements, and/or other elements). The document may, for example, be a slideshow type document.

Relevantly, the elements that are included in a given document page may be interactive elements.

For example, a document element may be associated with a link (e.g. a URL). When such an element is interacted with (e.g. by clicking using a pointing device, tapping on a touch screen display, or an alternative interaction) the link is followed—e.g. by launching a web browser (or other application) page.

As another example, a document element may be embed playable content into the document—e.g. an element which embeds a video (e.g. a YouTube or other video) into a document, an audio track, or other playable content. Such elements provide for interactions such as playing, pausing, stopping the playable content.

The data stored for a document, and the manner in which that data is stored, will depend on the particular application in question (with many alternatives possible). In the embodiments described herein the document data for a given document is stored in a device independent document record comprising a set of key-value pairs that define the document. To assist with understanding, a partial example of a document record is as follows:

| Key/field | Note | E.g. |
|---|---|---|
| Document ID | A unique identifier of the document. | "id": "abc123", |
| Version | An identifier of a specific version of the document. | "version": 1, |
| Creation date | The creation date of the document. | "creationDate": 1521858548000, |
| Dimensions | Dimensions (e.g. width and height) of the document's pages. A unit may also be specified, e.g. px, cm, inch, or a value (numeric or otherwise) that maps to such a unit | "dimensions": { "width": 1080, "height": 1080, "unit": 4 }, |
| Pages | An array (or other list/set of page descriptors). Each page descriptor defines, in turn, an array of element descriptors. | "pages": [ {"elements": [{...}, {...}, ..., {...}]}, {"elements": [{...}, {...}, ..., {...}]}, ..., {"elements": [{...}, {...}, ..., {...}]}, ], |
| Recorded interaction data identifier | An identifier of recorded interaction data associated with the document (if a presentation using the document has been recorded). | "recordedIntId": "pres1234" |

In this example, a document record includes an array of page records (each page record providing page data in respect of a page of the document). A page's position in a document's page array serves to identify the page and also determines its position in the document (i.e. a page at array index n appears after a page at array index n−1 and before a page at array index n+1).

In turn, each page record includes an array of element records. In a similar fashion, an element's position in a page's element array serves to identify that element and determines its depth on the page (i.e. an element at array index n is positioned above an element at array index n−1 and below an element at array index n+1).

Each element record provides data in respect of an element that has been added to a page. Generally speaking, an element is an object that has been added to a page—e.g. by copying (such as a drag and drop interaction in a document design user interface), importing from one or more element libraries (e.g. libraries of images, animations, videos, etc.), drawing/creating using one or more design tools (e.g. a text tool, a line tool, a rectangle tool, an ellipse tool, a curve tool, a freehand tool, and/or other design tools).

The element record for a given element defines (or provides a reference/link) to the actual data of the element itself—e.g. the image data (in the case of an image type element), text data (in the case of a text element), video data (in the case of a video element), and so forth. An element record will also define various attributes of the element, for example: size data (such as height and width); position data (such as an (x,y) coordinate); transparency data (defining any transparency); rotation data (defining any rotation of the element); flipped data (defining whether the element is flipped on an x and/or y axis); recolouring data (defining whether and how the element is recoloured); link data (defining a URL if the element is a hyperlink); and/or other element attributes.

By way of example, an element record for a rectangle element that is filled by an image element (and acts as a hyperlink) may have an element record such as the following (though additional and/or alternative attributes may be defined):

```
{
    "type": "RECT",
    "top": 255.82,
    "left": 214.66,
    "width": 755.90,
    "height": 503.62,
    "rotation": 0,
    "transparency": 0,
    "link": "http://www..... .com",
    "fill": {
        "image": {
            "media": {
                "id": "M1234AbcD",
                "version": 1
            },
            imageBox: {
                "top": 0,
                "left": 0,
                "width": 755.90,
                "height": 503.62,
                "rotation": 0
            },
            "transparency": 0,
            "recoloring": { }
        },
        "transparency": 0,
        "flipX": false,
        "flipY": false
    }
}
```

A stored presentation's recorded interaction data is data in respect of interactions that occur during recording of a presentation. Generally speaking, the recorded interaction data that is associated with a document (in this example via a document identifier and version identifier) will define a set of interaction events. Each interaction event provides data in respect of an interaction that occurred during recording of the presentation.

As with document data, the specific recorded interaction data that is stored for a recorded presentation, and the manner in which it is stored, will depend on implementation. Various possibilities exist. By way of example, however, a recorded interaction record for a given presentation may be as follows:

| Key/field | Note | E.g. |
| --- | --- | --- |
| Recorded Interaction data ID | A UUID for the recorded interaction record. | "recordedIntId": "abcd-1234" |
| Document ID | An identifier of the document used in the presentation. | "docId": "abc123", |
| Document version | An identifier of the version of the document used in the presentation. | "docVersion": 1, |
| Media type | A value indicating whether the media associated with the presentation is video data or audio data. | "mediaType": "Video", |
| Media ID | An identifier of the media associated with the presentation (used to access/retrieve the audio or video recording from, in this example, the media data store 118). | "mediaID": "Mabcd1234", |
| Events | An event dataset (e.g. dictionary, array, list, or other data structure) as discussed further below. . . | "events": {...}, |
| Creator ID | The user identifier used to record the presentation. | "creatorID": "u12345", |
| Created at Timestamp | A timestamp of when the presentation was recorded. | createdAt": 1521858548000 |

In this example, events are stored in a set of event records (referred to as the events dataset). Each event record defines an event that occurred during recording of the presentation. The data stored for a given event includes an event timestamp (defining when in the presentation the event occurs) and event data (defining the actual event that occurred).

For example, one type of event is a page navigation event. This defines an event in which the presenter (or another user) navigates from a current document page to another document page during recording of the presentation. By way of example, the event record for a page navigation event may take a format such as:

---
"navigation":{"page": 0, "timestamp": 0},
---

In this example, each event record for a page navigation event defines a target page (i.e. the page that was transitioned to in the event) and a timestamp (i.e. the time in the recording that the event occurred).

Data in respect of other types of events may also be stored in the events dataset. In this case each event record in the dataset will define a timestamp (indicating the time of the event) and event data (defining the event and allowing replay thereof).

For example, Australian patent application AU 2020901701 describes interactive presentation systems and methods in which a presenter can deliver a live presentation to an audience (i.e. one or more user devices) and record that presentation. The systems and methods described in AU 2020901701 facilitate both presenter and audience member interactions. The contents of Australian patent application AU 2020901701, titled "Systems and methods for interactive presentations", filed on 26 May 2020, are incorporated herein by reference.

As described in AU 2020901701, where a presentation is recorded with one or more live audience members an audience member may submit a reaction (e.g. an approval reaction such as a thumbs up, a disapproval reaction such as a thumbs down, or an alternative reaction). Data in respect of such of a reaction may be recorded and persisted in the event data for the presentation. By way of example, the event record for a reaction event may take a format such as:

---
"reaction": {"reactionID": 1, "UserId": "U1234", "timestamp": 2800},
---

In this example, each event record for a reaction event defines: a reaction identifier (a value indicating the type of reaction—e.g. ID 1=approval reaction, ID 2=disapproval reaction, etc,); a UserId (the identifier of the user that made the reaction, if known and recorded); a timestamp (indicating when in the recording the reaction was made).

As yet a further example, and as also described in AU 2020901701, where a presentation is recorded with one or more live audience members an audience member may submit a comment (e.g. text). Data in respect of such of a comment may be recorded and persisted in the event data for the presentation. By way of example, the event record for a comment event may take a format such as:

---
"comment": {"text": "this is awesome", "UserId": "U3334", "timestamp": 1200},
---

In this example, each event record for a comment event defines: text (a string of the text submitted in the comment); a UserId (the identifier of the user that made the comment, if known and recorded); a timestamp (indicating when in the recording the comment was made).

Additional and/or alternative event types (and or event record formats) are possible. With these example event types, however, the event dataset for a given presentation may take a form such as:

---
"events" : {
  "navigation":{"page": 0, "timestamp": 0},
  "comment": {"text": "this is awesome", "UserId": "U3334", "timestamp": 1200},
  "navigation":{"page": 1, "timestamp": 2500},
  "reaction": {"reactionID": 1, "UserId": "U1234", "timestamp": 2800},
  "reaction": {"reactionID": 1, "UserId": "U8888", "timestamp": 2850},
  "navigation":{"page": 2, "timestamp": 4000},
  "reaction": {"reactionID": 2, "UserId": "U8888", "timestamp": 4100},
  ...
}
---

The recorded interaction data examples provided above are examples of how recorded interaction data may be persistently stored. In some implementations, interaction data is stored in persistent storage (e.g. as above or in alternative data structures) as and when it occurs while a presentation is being recorded.

In alternative implementations, interaction data may, while a presentation is in progress, be temporarily stored alternative data structures (and, indeed, alternative memory devices) and then transferred to persistent memory at the end of a presentation (or periodically throughout a presentation). For example, the systems and methods described in AU 2020901701 operate such that interactions are initially stored in an in-memory database (e.g. a Redis database). Once a presentation is complete the interaction data recorded throughout the presentation is then processed and stored in persistent storage (e.g. a media data store such as 118).

Figure 3:
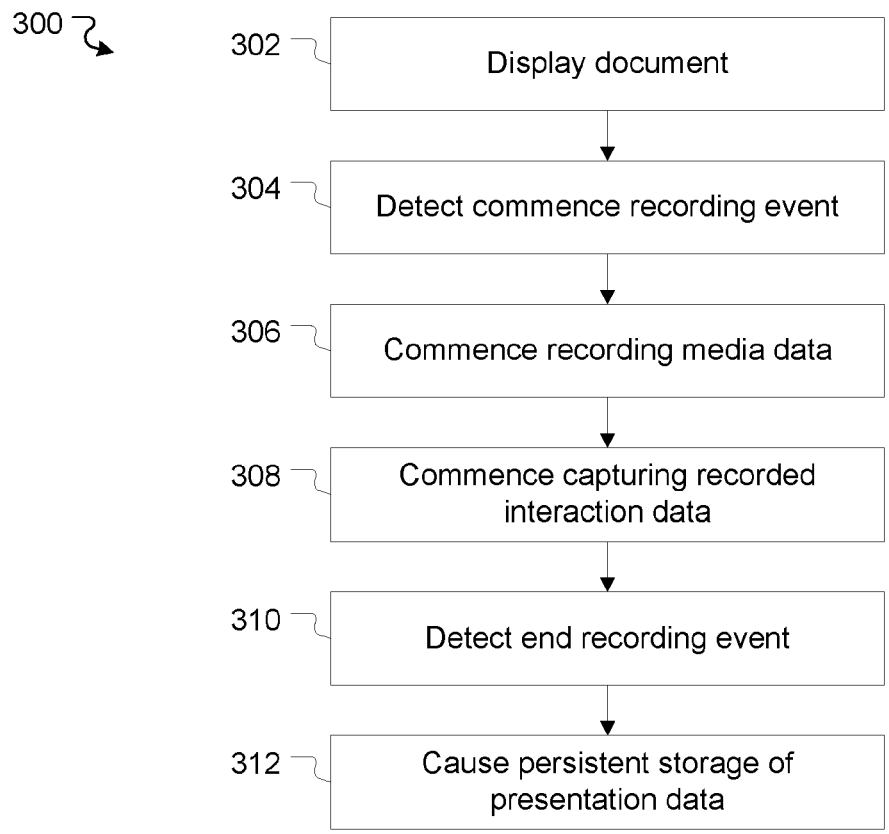
FIG. 3 depicts operations performed in recording a presentation.

Turning to FIG. 3, operations performed in a presentation recording process 300 will be described.

A presentation that is being recorded may be recorded without being delivered live to an audience. Alternatively, a presentation that is being recorded may be a presentation that is being delivered/streamed to a live audience: i.e. as the presenter is speaking, audio/video of the presenter (along with the document the presenter is using) is streamed to one or more client applications as well as being recorded. Examples of systems and methods for delivering and recording interactive presentations are described in AU 2020901701.

At 302, client application 132A displays a document (or a page thereof) on a display 218 of client system 130A.

Figure 4:
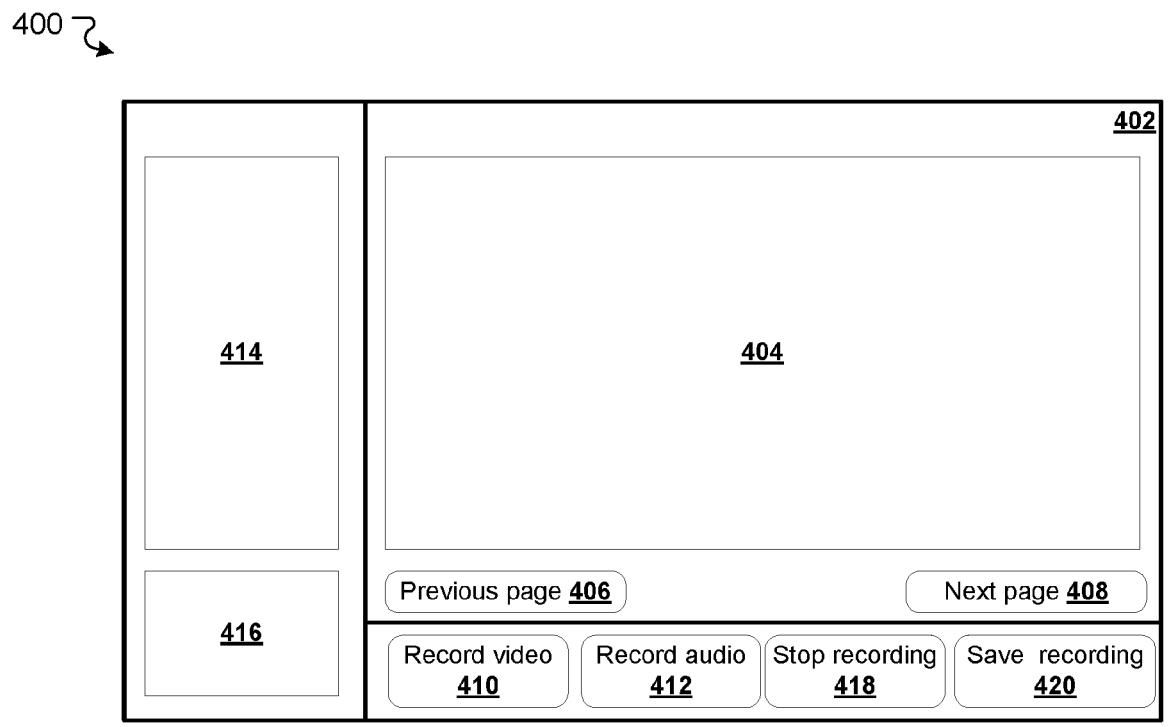
FIG. 4 depicts an example presentation recording user interface.

The document is displayed in a user interface (UI) generated by the client application 132A. FIG. 4 provides one example of such a UI 400 which includes a document display region 402 in which a document page 404 is displayed. Example UI 400 also includes a previous page control 406 and a next page control 408 (which, when activated, respectively cause a previous/next page of the document to be displayed (if possible)).

The document may be a document that has been created using various design tools provided by client application 132A (and sever environment 110). Alternatively, the document may have been created using an alternative tool and imported into client application 132A. In the present embodiment the document is stored in and retrieved from document store 114—for example by client application 132A submitting a request to front end server 112 (the request including an identifier of the document), the front end server 112 retrieving the document data from the document data store 114 and communicating it to the client application 132A, and the client application 132A displaying the document (or a first page thereof).

At 304, client application 132A detects a commence recording event. This may, for example, be user input activating a 'record' control or the like. In example UI 400 two separate record controls are provided: a record video control 410 and a record audio control 412. In alternative embodiments a single 'record' control may be provided. Alternatively, a recording session may have a scheduled start time and reaching that time is the start recording event.

At 306, in response to detecting the commence recording user input, the client application 132A commences recording media data captured by one or more relevant media devices. If the relevant media device(s) are not active, client application 132A activates that/those device(s).

If video is being recorded (e.g. in response to activation of a record video control such as control 410) the media recording device(s) include camera 220 and microphone 222 devices of the client system 130A. In the present embodiment, client application 132 also displays the image currently being captured by the camera 220 (for example in a camera image UI element 414), and displays a microphone level indicator (e.g. in an audio level UI element 416). In this case the media data generated and recorded is video data (comprising both audio and visual data).

If only audio is being recorded, the media recording device(s) include a microphone device 222 device of the client system 130A. In this case no camera image is displayed (or recorded) and the media data generated and recorded is audio data only.

In the present embodiments, client application 132A initially stores media data on a memory device of the client system 130A (e.g. in volatile memory 208 or non-transient memory 210).

Where client application 132A is a web browser, commencement and management of the audio/video recording may be achieved via use of an appropriate application programming interface (API) library—for example the MediaDevices interface.

At 308, the client application 132A commences capturing recorded interaction data generated by the presenter (or the presenter's application 132A). The particular interaction data captured during the recording process, and the manner in which it is captured, will depend on the types of interaction events that are allowed for. In the present example, and as described above, the interaction data captured for each interaction event includes an event timestamp, an event type, and event data (or data from which these fields can be generated).

During recording of a presentation, interaction data may be stored in any appropriate manner.

As one example, data in respect of page navigation events performed by a presenter may be captured by the presenter's client application 132A during recording. As described above, this may include a timestamp and a page identifier (e.g. the page number of the page navigated to). The client application 132A may then communicate the event data (in real time or otherwise) to front-end server 112 to store in the recorded interaction data store 116.

As an alternative example, interaction data may be initially captured and stored as described in AU 2020901701. The systems and methods described in AU 2020901701 facilitate both presenter interactions (referred to as 'supplemental presentation content' in AU 2020901701) and also participant interactions (for example comments submitted through the original delivery of the presentation by audience members). For example, AU 2020901701 describes that interactions may be stored in a Redis Stream data type as follows as follows:

```
STREAM sip:{session_id}:events (
    // unique identifier of the author of the interaction.
    author_id string,
    // author name of the interaction
    author_name string,
    // Enum type of the event performed
    event_type string,
    // JSON representation of the content
    content string,
    // Creation time of the content
    timestamp numeral
)
```

This approach may also be used for capturing presenter interactions such as page navigation events. For example, presenter interactions may be stored in the same (or a similar) data structure as audience member interactions. In this case: the author id and author_name will (if captured) be the ID and name of the presenter; the event_type will be a value indicating it is a presentation document page navigation event; the content will define the page navigation (e.g. the document page to which the presenter navigates to and/or the page from which the presenter navigates); and the timestamp will be the timestamp of the page navigation.

More generally, for page navigation events, capturing interaction data includes client application 132A monitoring for page transitions. This may, for example, be monitoring for activation of a previous or next page control such as 406/408 or an alternative event causing a page transition (e.g. activation of another user control, or an automated page transition event (e.g. based on a defined transition delay or other automated page transition timing)).

When a page transition occurs, the client application 132A captures an event timestamp (e.g. the number of milliseconds/seconds since recording media data commenced) as well as event data (for example an identifier of the page that has been transitioned to).

During the course of the presentation (which occurs between detecting the commence recording input at 304 and detecting an end recording input at 310), the client application 132A continues to record media data and capture recorded interaction data in respect of interaction events.

At 310, the client application 132A detects an end recording event. This may, for example, be user input activating an 'end recording' control or the like (such as control 416 of UI 400). Alternatively, a recording session may have a maximum duration and the end recording event may be the expiry of that duration.

At 312, the client application 132A causes the presentation data captured during the presentation (e.g. the media data and recorded interaction data) to be persistently stored at the server environment 110. This may be in response to detection of the end recording event 310, or in response to a save recording event (e.g. user input activating a 'save' control such as control 420 of UI 400).

The particular operations performed at 312 will depend on how media data and recorded interaction data are captured during the recording. If media data is initially stored locally at the client system 130A that data (or a processed version thereof) is communicated to the front end server 112. Similarly, if recorded interaction data is initially stored locally at the client system 130A that data (or a processed version thereof) is communicated to the front end server 112. If media and recorded interaction data are both communicated to the front end server 112 during recording, causing the presentation data to be stored may involve generating and communicating a message to the front-end server 112 indicating that the presentation has ended and is to be persistently stored.

On receiving the presentation data and/or a communication indicating that the presentation has ended and is to be stored, the front end server 112 causes the presentation data to be persistently stored. In the present example, the front end server stores recorded interaction data in the recorded interaction data store 116 and media data in the media data store 118.

If not already performed, persistent storage of the presentation data involves the front-end server 112 updating document data to reflect that the document is now associated with a recorded presentation. Continuing with the data structures described above, this may involve creating a recorded interaction data identifier and storing this in the descriptor of the document used in the presentation and the recorded interaction record (if these have not already been generated/stored). In addition, and also if not already done, when the media data is stored at the media data store 118 a media ID is created that can be used to access the stored media. The media ID is, in the present embodiment, also stored in the recorded interaction record.

Accordingly, and in the present embodiment, once presentation data has been stored: the document descriptor for the document used in the presentation includes an identifier of a recorded interaction record; the recorded interaction record (stored, in this example, in the recorded interaction data store 116) defines a particular version of the document used in the presentation, a set of interaction events, and a media identifier that points/links to media data (stored, in this example, in the media data store 118); the media data stores the actual video or audio content recorded whilst giving the presentation.

Operations performed in replaying a recorded presentation will now be described with reference to FIG. 5 (which depicts client-side operations 500), FIG. 6 (which depicts server-side operations 600), and FIG. 7 (which depicts an example user interface 700 displayed at a client system 132).

At 502, client application 132B generates a document request and communicates this request to the front-end server 112.

The document request includes an identifier of a particular document. The document request may also include an identifier of a particular version of the document in question. The document request may be generated in response to user input selecting the document. This may, for example, be by a user searching/browsing/selecting a particular document, a user activating a URL or other link that identifies the document and has been communicated to the user (e.g. in an email, instant message, or other communication), or by alternative means.

At 504, the client application 132B receives document data from the front-end server 112.

At 506, the client application 132B processes the document data to display the requested document (or, at least, a specific—e.g. first—page thereof). The document may be displayed in a UI generated by the client application 132B. FIG. 7 provides one example of such a UI 700 which includes a document display region 702 in which document pages 704 are displayed. In this particular example, UI 700 includes previous and next page controls 706 and 708 (which, when activated, respectively cause a previous/next page of the document to be displayed (if possible)).

In the present example, the document requested at 502 is associated with recorded interaction data. In the present implementation, where a document is associated with recorded interaction data the server environment 110 automatically sends this data to the client application 132B. Accordingly, at 508 the client application 132B receives recorded interaction data that is associated with the document from the server environment 110 (e.g. from the front-end server 112).

In alternative embodiments, recorded interaction data may need to be explicitly requested by the client application 132B. In this case, the client application 132B may display a replay presentation control (or similar), as discussed below, on detecting that recorded interaction data exists and only request the interaction data on activation of that control. In this case, the client application 132B may detect that recorded interaction data exists based on a flag or other variable received from the server environment 110 with the document data.

At 510, the client application 132B displays a replay presentation control (for example control 710 of UI 700). In the present embodiment, client application 132B displays the replay presentation control 710 in response to determining that the requested document is associated with a recorded presentation (which, in this case, is determined on receiving recorded interaction data at 508). In alternative embodiments a replay presentation control 710 may be permanently displayed in UI 700, however in this case the control will not be active if the displayed document is not associated with a recorded presentation.

In addition to the replay presentation control, client application 132B may also display other playback-type controls—e.g. a stop control (not shown, though once activated the play control may be turned into a stop control), a pause control 712, a volume control 714, a skip forward control (not shown), a skip back control (not shown), and/or other playback-type controls.

In the present example, the recorded interaction data includes a media type identifier which identifies a type of the media associated with the recorded presentation (e.g. video or audio). The client application 132B may be configured to use the media type identifier to adapt the UI elements that are displayed—for example the specific playback-type controls that are provided in the UI.

At 512, the client application 132B detects occurrence of a replay presentation event. The replay presentation event may be user input activating a replay presentation control such as 710. Alternative replay presentation events are possible. For example, client application 132B may be configured to automatically commence replay of a recorded presentation, either on receipt of recorded interaction data at 508 or after a defined time period from receipt of that data has lapsed.

At 514, in response to detecting the replay presentation event, the client application 132B generates a media data request and communicates it to the server environment 110. In the present example the media data request is communicated to the front-end server 112 which then communicates with the media data store 118 (or a service associated therewith). The media data request includes an identifier of the media data that is associated with the saved presentation (and, in this instance, is received with the recorded interaction data at 508). By way of example, the media data request may be in the form of a HTTP request to a URL that includes the media identifier.

In response to detecting the replay presentation event, the client application 132B may make adjustments to certain user interface elements. For example, in certain embodiments the client application 132B may hide (or disable) any page transition controls (e.g. previous and/or next page controls such as 706 and 708). This may be done to prevent the user viewing the recorded presentation from manually changing pages during the replay, ensuring that the displayed page remains synchronised with the recorded presentation. In other implementations and as described below, page transition controls may remain active during presentation replay.

At 516, the client application 132B receives the media data from the server environment 110—in this case from the media data store 118 (or its associated service).

At 518, the client application 132B commences replay of the recorded presentation.

At 518, the client application 132B has document data (defining one or more document pages), recorded interaction data (defining one or more interaction events), and media data (providing an audio or video recording).

Where the media data is video data, client application 132B causes the picture of the recorded video to be displayed in a video UI element, e.g. 716 of UI 700.

In order to replay the presentation, the client application 132B synchronises interaction events (based on their timestamps) with the audio or video recording. For example, if the recorded interaction data defines a page navigation event with a timestamp of 3000 milliseconds and event data indicating the navigation was to page 2, at three seconds into replay of the media data the client application 132B will cause the displayed document to navigate to page 2 of the document.

Absent user intervention, the replay will continue for the length of the presentation. A user may, however, control the replay by use of the available UI controls (e.g. to stop, pause, skip forward, skip back, and/or perform other replay command options).

In certain implementations, the client application 132B uses the recorded interaction data (and in particular page navigation events defined thereby) to generate a presentation timeline which provides a visual indication of the page transitions that occur over the course of the recorded presentation. The client application 132B may, for example, generate and display the timeline at 510 (i.e. after receiving the recorded interaction data and at the same time as displaying the replay presentation control) or an alternative time (e.g. at 518 on commencing replay of the presentation).

User interface 700 provides one example of such a presentation timeline 718. In this example, timeline 718 is divided into segments 720, each segment representing a page of the document and providing a visual indication of when in the presentation that page was navigated to and approximately how long the presenter spent talking to that page in the presentation. Timeline 718 also includes a current position marker 722 indicating the current position in the replay and, in this example, highlights the document page that is synchronised with the current position in the presentation replay. Current position marker 722 may be manipulated by a user (e.g. dragged to the left or the right) to change the current position in the presentation replay. In addition, a user may interact directly with a given segment of the 720 of the timeline 718 to jump directly to the start of that segment. For example, if a user clicks/taps/otherwise interacts with the segment 720A (which represents page 7), the client application 132B will jump directly to the time in the presentation at which page 7 was navigated to (the timing of which being defined by the relevant page-transition event) and cause page 7 to be displayed in region 702.

While timeline 718 indicates a presentation in which all page transitions were in order (i.e. page 1 to 2 to 3 to 4 to 5 to 6 to 7 to 8) this need not be the case. For example, when recording a presentation a presenter may jump around between the available document pages in any desired order—e.g. from page 1 to 4 to 2 to 3, back to 2, to 5, to 7, to 8 (omitting page 6 entirely). In this case the timeline 718 is constructed, based on the page navigation events, to reflect this.

Turning to FIG. 6, server-side operations performed to facilitate replay of a recorded presentation will be described.

At 602, the front-end server application 112 receives a document request from client application 132B. The document request includes an identifier of a particular document. The document request may also include an identifier of a particular version of the document in question. The document request may be the request communicated from the client application 132B at 502 described above.

At 604, the front-end server application 112 uses the document identifier (and, if relevant, version identifier) to retrieve document data from the document data store 114.

At 606, the front-end server application 112 communicates the document data to the client application 132B.

At 608, the front-end server application 112 determines that the document is associated with a recorded presentation. In the present embodiment, the front-end server application determines this via the existence of a recorded interaction data identifier in the document data.

At 610, in response to determining that a recorded presentation is associated with the document, the front-end server application 112 automatically retrieves the recorded interaction data associated with the document from the recorded interaction data store 116 using the recorded interaction data identifier.

At 612, the front-end server 112 communicates the recorded interaction data to the client application 132B.

As noted above, in alternative embodiments the front-end server 112 may not automatically retrieve the recorded interaction data at 610, but instead do so on receiving a request from the client application 132B.

At 614, the media data store 118 (or a service associated therewith) receives a media data request from the client application 132B. The media data request includes a media data identifier. The media data request may be the request communicated from the client application 132B at 514 described above.

At 616, the media data store 118 (or associated service) uses the media data identifier to access the media data).

At 618, the media data store 118 (or associated service) communicates the media data to the client application 132B.

As will be appreciated, the above process allows a presenter to pre-record a presentation. The recording can then be played back at a later time without the presenter needing to be present. Although a client system 132B will replay the presentation as originally recorded, the audio/video data is separate to the document itself. As a result, the actual document that was used in recording the presentation is displayed (as opposed, for example, to a merged version thereof in a video file format).

As a consequence of this, a user viewing the recorded presentation can still interact with the document—for example by selecting page elements, adjusting page elements (if desired and permissions permit), and interacting with any interactive page elements. If, instead, a single/monolithic video recording was provided interacting with the document would not be possible.

Furthermore, a presenter may, in certain circumstances, be able to amend the presentation document after recording the presentation without having to then re-record the presentation. Consider, for example, a presenter who records a presentation involving a particular document. After recording the presentation, the presenter realises that a change is needed to one or more pages of the document (e.g. to correct a typographical error, provide updated data, and/or for any other reason). Where presentations are recorded as a single, merged video file making any such change is not possible (or, at the least, highly complicated as it involves editing the encoded monolithic video file). In the present context, however, such changes made in the same way any other document changes are made: opening the document and editing it as desired. In this case, client application 132A may prevent a user from deleting a document page that is referenced by a page navigation event (or, alternatively, generate and present a warning to a user that a page they are attempting to delete is part of a recorded presentation).

Figure 8:
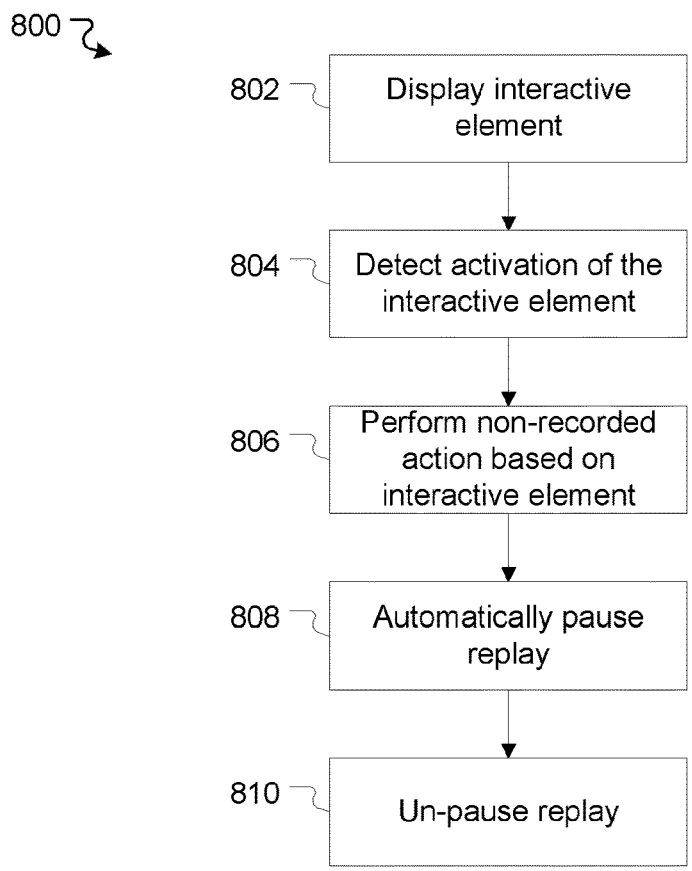
FIG. 8 depicts operations performed when a user interacts with an interactive element during replay of a presentation.

FIG. 8 depicts a flowchart 800 showing operations performed when a user interacts with an interactive element during replay of a presentation.

At 802, the client application 132B displays a document page that includes one or more interactive elements. By way of example, an interactive element may be a page element that is associated with a link such as a URL. For example, UI 700 depicts an interactive page element 730 on page 704 (in this particular example, a circular graphic with the word 'Link' on it).

At 804, during replay of the presentation, the client application 132B detects interaction with an interactive element. This may, for example, be mouse click, tap gesture on a touch screen display, or any other interaction selecting or activating the interactive element.

At 806, in response to detecting interaction with the interactive element, the client application 132B performs a non-recorded action based on the interactive element. Non-recorded, in this sense, indicates that the action is not one that was recorded with the presentation and is not included in/defined by the recorded interaction data.

The particular non-recorded action that is performed will depend on the interactive element that is interacted with (and, if multiple interactions are possible with respect to a particular interactive element, the particular interaction). For example, where the interactive element is an element that is associated with a URL, the non-recorded action performed by the client application 132B will be displaying a web (or other application) page on which is displayed further data that is retrieved (or based on data retrieved) using the URL associated with the interactive element. The web (or other application) page may be displayed in a new browser (or other application) window or tab. The further data for the new page may be requested/received from the address defined by the URL which may, for example, be third party server application 142.

More generally, the non-recorded user interaction may involve client application 132B displaying one or more new user interface elements that are based on the further data.

In certain implementations, on detecting interaction with an interactive element during a presentation replay the client application 132B may be configured to continue replay of the presentation. In other implementations, the client application 132B may be configured to automatically pause the replay on detecting interaction with an interactive element as depicted at 808. In this case the client application 132B may un-pauses (or recommences) replay of the presentation at 810. Client application 132B be configured to automatically restart/un-pause the replay when user focus is returned to the replay user interface. For example, if interaction with the interactive element causes a new page or tab to be displayed client application 132B may determine that focus is returned to the replay user interface when the user returns to the window or tab in which the presentation is being displayed. Alternatively, the client application 132B may only restart the reply on detecting user input that activates an un-pause or play control such as 710.

As mentioned above, in certain implementations the client application 132B may be configured to permit user input that manually navigates through document pages during replay of a presentation. For example, client application 132B may maintain previous and next page controls such as 706 and 708 in an active state and, in response to user interaction with these controls, navigate through the document pages.

Client application 132B may be configured to handle manual navigation through document pages during a presentation replay in various ways.

For example, in one implementation client implementation 132B may be configured to synchronise the media replay with whatever page is navigated to. In other words, if a user manually navigates to page n during replay, the client application 132B will determine a timestamp associated with page n (if one exists) and automatically seek to that timestamp in the audio/video playback.

In the present embodiment, in order to determine a timestamp associated with page n, client application 132B initially inspects future page navigation event records—i.e. page navigation event records with timestamps occurring after a current playback time. Future page navigation event records are searched in forward chronological order from the current playback time. If client application 132B identifies a future page navigation event record that references the page the user has manually navigated to, it seeks to the timestamp associated with that event record. If no future page navigation event record exists, client application 132B inspects historical page navigation event records (i.e. page navigation event records with timestamps occurring before the current playback time). Historical page navigation event records are searched in reverse chronological order from the current playback time. If client application 132B identifies a historical page navigation event record that references the page the user has manually navigated to, it seeks to the timestamp associated with that event record.

Where a document page is not referenced by a page navigation event, client application 132B may prevent manual navigation to that page while a presentation is being replayed. Alternatively, client application may permit manual navigation to such a page during replay but on detecting navigation to a page that is not referenced in a page navigation event pause the playback (and/or generate an alert indicating that the page selected by the user was not shown during the recorded presentation).

Alternatively, client application 132B may allow manual navigation through pages during a replay to be independent of the recorded presentation and stored interaction events. In this case, if a user manually navigates to a page that does not match the page that was displayed at the current point in the media replay the client application 132B may continue playing the media replay (i.e. without any seeking/adjustment). At the same time, client application 132B may display a current page indicator that indicating that the currently displayed page is out of synchronisation with the media recording and which page of the presentation matches the current point in the media replay. For example, if a user has manually skipped ahead to page five of a presentation (by use of a next page control such as 708) even though the current point of the media replay should be synchronised with page two of the presentation, a current page indicator such as 732 may be displayed to inform the user that the page matching the current time in the media replay is in fact page two.

Where manual page navigation is permitted during a presentation replay, and a page navigation event occurs, the client application 132B may be configured to navigate to the page in question at the timestamp indicated by the event (i.e. the page navigation is handled normally). Alternatively, instead of navigating to the page, the client application 132B may detect that the displayed page is out of synchronisation and update the current page indicator 732 without automatically navigating to the page indicated by the page navigation event. In this case an additional alert (visual and/or audible) may also be presented to let the user know what page is currently synchronised with the replaying media.

Where displayed, the current page indicator 732 may be an interactive element, selectable by a user to cause the page indicated by the indicator 732 to be displayed.

As further examples, and as discussed above, comment- and reaction-type event records may be stored in the event dataset. Comment- and reaction-type events may be processed in the same way as page navigation events: i.e. when the timestamp associated with the event record matches the current replay time, the data of the event record is processed by the client application 132B.

Figure 7:
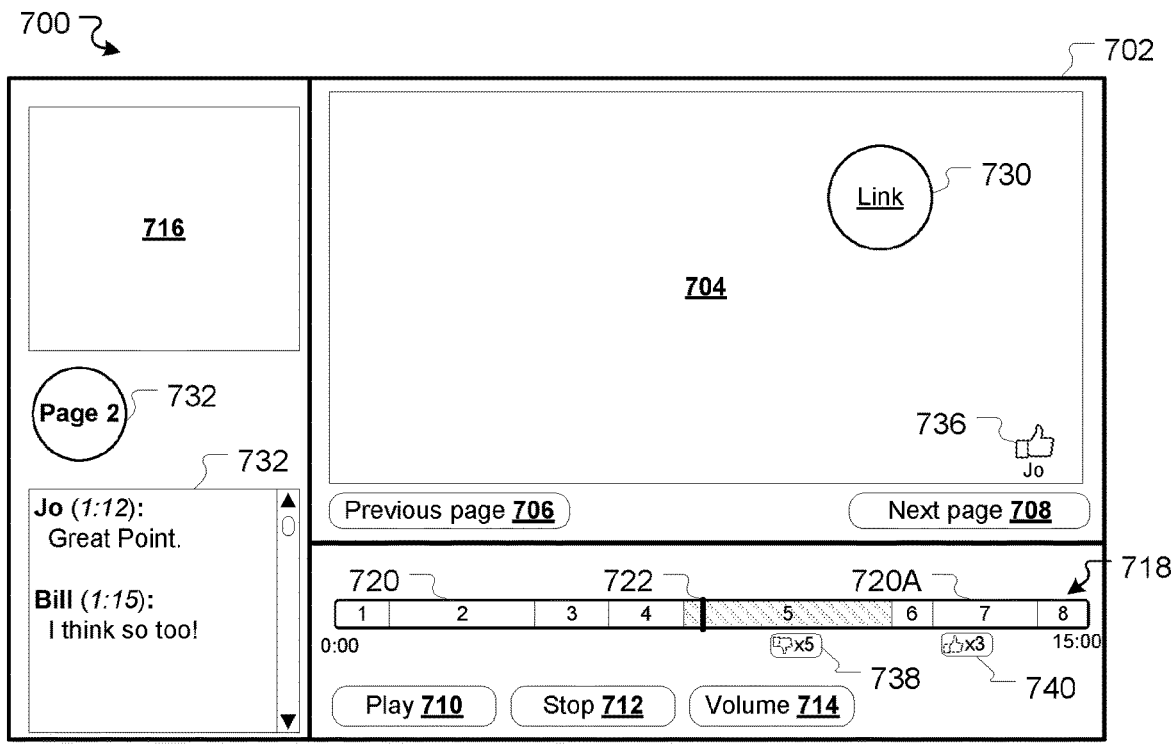
FIG. 7 depicts an example presentation replay user interface.

For a comment-type event, the client application 132B may, for example, display the name of the author of the comment, the time the comment was made, and the text of the comment in a comments pane such as 734 of FIG. 7. For example, in FIG. 7, "Jo" has made the comment "Great point." 1 minute and 12 seconds into the presentation and "Bill" has made the comment "I think so too!" 1 minute and 15 seconds into the presentation.

For a reaction-type event, the client application 132B may, for example, display an icon or graphic associated with the reaction (e.g. a thumbs-up graphic, a thumbs-down graphic, an alternative graphic)—for example reaction graphic 736 of FIG. 7. The reaction graphic may be displayed with a user name (or avatar or other indicator) of the user who originally made the reaction. After being displayed, client application 1326 may be configured to automatically hide a reaction graphic such as 736, for example at a predetermined time after displaying it (e.g. 5 seconds or an alternative time), or when a page navigation event occurs and a new document page is displayed.

Reaction graphics may additionally, or alternatively, be displayed on timeline 718. For example, when generating timeline 718 the client application 132B may parse the recorded interaction data to retrieve all reaction-type interactions and then display reaction graphics for those interactions on the timeline 718. Various approaches are possible here. For example, client application may display reaction graphics at the time indicated by their event timestamps (and simply overlap reaction graphics on the timeline if their timing is such that this is required). Alternatively, client application 132B may be configured to aggregate reaction graphics that occur within a defined time period—for example if three "thumbs-up" reactions occur within (say) 5 seconds, instead of displaying three thumbs-up reaction graphics on timeline 718 client application 132B may display a single thumbs up graphic with an 'x3' annotation. Two examples of this are provided in UI 700: reaction graphic 738 with annotation that indicates there were 5 thumbs-down reactions that occurred within the defined time period approximately midway through page 5, and reaction graphic 740 that indicates there were 3 thumbs-up reactions that occurred within the defined time period part way into page 7. A user interface control for toggling display of reaction graphics on/off may be provided.

UI 400 of FIG. 4 and UI 700 of FIG. 7 have been provided as examples of user interfaces that may be generated by a client application 132 to facilitate recording of a presentation and replay of a recorded presentation. It will be appreciated that alternative user interfaces having additional, fewer, or alternative UI controls/elements, are possible.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required by context, the terms "first", "second", etc. are used to differentiate between various elements and features and not in an ordinal sense. For example, a first document page could be termed a second document page or vice versa without departing from the scope of the described examples. Furthermore, when used to differentiate elements a second element or feature could exist without a first element or feature. For example, a second user input could occur before a first user input (or without a first user input ever occurring).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
generating, at a client system, a document request identifying a presentation document, wherein the presentation document includes a plurality of pages and a first page of the presentation document includes an interactive page element;
communicating the document request to a server system;
receiving document data in respect of the presentation document;
receiving recorded interaction data defining one or more interactive events that occurred during a recording of a presentation associated with the presentation document;
receiving media data including audio and/or video data recorded during the recording of the presentation; and
replaying the presentation at the client system by using the recorded interaction data to synchronise display of the plurality of pages with playback of the media data, wherein replaying the presentation includes:
displaying, during the replay of the presentation, the first page of the presentation document, wherein displaying the first page of the presentation document includes displaying the interactive page element as part of the first page of the presentation document;
detecting a first user input activating the interactive page element; and
in response to detecting the first user input, performing a non-recorded action, wherein the non-recorded action is based on data that is associated with the interactive page element.

2. The computer implemented method of claim 1, wherein:
the interactive page element is associated with a universal resource locator (URL); and
performing the non-recorded action comprises:
retrieving further data using the URL; and
displaying one or more further user interface elements based on the further data.

3. The computer implemented method of claim 2, wherein displaying the one or more further user interface elements includes displaying a new webpage in a new web browser window.

4. The computer implemented method of claim 2, wherein:
replaying the presentation includes displaying the first page of the presentation document in a first window; and
displaying the one or more further user interface elements in a second window.

5. The computer implemented method of claim 1, wherein in response to receiving the first user input, the method further includes automatically pausing replay of the presentation.

6. The computer implemented method of claim 1, wherein:
for each interactive event the recorded interaction data defines event data and an event timestamp; and
synchronising the display of the plurality of pages with the playback of the media data is performed based on the interaction timestamps associated with one or more page navigation-type interactive events.

7. The computer implemented method of claim 1, wherein prior to receiving the media data and replaying the presentation the method further includes:
displaying one of the plurality of presentation document pages and a play presentation control;
detecting a second user input activating the play presentation control; and
in response to detecting the second user input:
generating a media data request, the media data request including a media data identifier of the media content;
communicating the media data request to the server system;
receiving the media data; and
commencing the replay of the presentation.

8. The computer implemented method of claim 7, wherein the media data identifier is included in the recorded interaction data.

9. The computer implemented method of claim 7, wherein the play presentation control is displayed in response to receiving the recorded interaction data.

10. A computer processing system comprising:
one or more processors;
a display;
a communication interface; and
a non-transient computer-readable storage medium storing sequences of instructions, which when executed by the one or more processors, cause the one or more processors to perform a method including:
generating, a document request identifying a presentation document, wherein the presentation document includes a plurality of pages and a first page of the presentation document includes an interactive page element;

communicating the document request to a server system;

receiving presentation document data in respect of the presentation document;

receiving recorded interaction data defining one or more interactive events that occurred during a recording of a presentation associated with the presentation document;

receiving media data including audio and/or video data recorded during the recording of the presentation; and replaying the presentation by using the recorded interaction data to synchronise display of the plurality of pages with playback of the media data, wherein replaying the presentation includes:

displaying, on the display and during the replay of the presentation, the first page of the presentation document, wherein displaying the first page of the presentation document includes displaying the interactive page element as part of the first page of the presentation document;

detecting a first user input activating the interactive page element; and in response to detecting the first user input, performing a non-recorded action, wherein the non-recorded action is based on data that is associated with the interactive page element.

11. The computer processing system of claim 10, wherein:
the interactive page element is associated with a universal resource locator (URL); and
performing the non-recorded action comprises:
retrieving further data using the URL; and
displaying one or more further user interface elements based on the further data.

12. The computer processing system of claim 11, wherein displaying the one or more further user interface elements includes displaying a new webpage in a new web browser window.

13. The computer processing system of claim 11, wherein:
replaying the presentation includes displaying the first page of the presentation document in a first window; and
the one or more further user interface elements are displayed in a second window.

14. The computer processing system of claim 10, wherein in response to receiving the first user input, the method further includes automatically pausing replay of the presentation.

15. The computer processing system of claim 10, wherein:
for each interactive event the recorded interaction data defines event data and an event timestamp; and
synchronising the display of the plurality of pages with the playback of the media data is performed based on the interaction timestamps associated with one or more page navigation-type interactive events.

16. The computer processing system of claim 10, wherein prior to receiving the media data and replaying the presentation the method further includes:
displaying one of the plurality of presentation document pages and a play presentation control;
detecting a second user input activating the play presentation control; and
in response to detecting the second user input:
generating a media data request, the media data request including a media data identifier of the media content;
communicating the media data request to the server system;
receiving the media data; and
commencing the replay of the presentation.

17. The computer processing system of claim 16, wherein the media data identifier is included in the recorded interaction data.

18. The computer processing system of claim 16, wherein the play presentation control is displayed in response to receiving the recorded interaction data.

19. Non-transient computer-readable storage medium storing sequences of instructions, which when executed by one or more processors, cause the one or more processors to perform a method including:
generating a document request identifying a presentation document, wherein the presentation document includes a plurality of pages and a first page of the presentation document includes an interactive page element;
communicating the document request to a server system;
receiving document data in respect of the presentation document;
receiving recorded interaction data defining one or more interactive events that occurred during a recording of a presentation associated with the presentation document;
receiving media data including audio and/or video data recorded during the recording of the presentation; and
replaying the presentation by using the recorded interaction data to synchronise display of the plurality of pages with playback of the media data, wherein replaying the presentation includes:
displaying, during the replay of the presentation, the first page of the presentation document, wherein displaying the first page of the presentation document includes displaying the interactive page element as part of the first page of the presentation document;
detecting a first user input activating the interactive page element; and
in response to detecting the first user input, performing a non-recorded action, wherein the non-recorded action is based on data that is associated with the interactive page element.

* * * * *